United States Patent [19]

Mech et al.

[11] Patent Number: 4,578,608
[45] Date of Patent: Mar. 25, 1986

[54] COUPLING FOR ELECTRIC MOTORS

[75] Inventors: Christian Mech; Daniel Gironde, both of L'Isle Adam, France

[73] Assignee: Alsthom-Atlantique, Paris, France

[21] Appl. No.: 714,763

[22] Filed: Mar. 22, 1985

[30] Foreign Application Priority Data

Apr. 2, 1984 [FR] France .................................. 84 05164

[51] Int. Cl.⁴ .......................... F04D 13/08; F16D 1/04
[52] U.S. Cl. ..................................... 310/112; 285/138; 310/71; 310/87; 333/255; 403/364
[58] Field of Search .................... 310/42, 75 D, 68 R, 310/71, 87, 89, 112; 285/138, 330; 333/255, 261; 403/364, 380

[56] References Cited

U.S. PATENT DOCUMENTS

| | | | |
|---|---|---|---|
| 3,384,769 | 5/1968 | Schaefer et al. | 310/87 |
| 4,350,911 | 9/1982 | Wilson et al. | 310/87 |
| 4,385,668 | 5/1983 | Becker et al. | 285/138 |
| 4,409,504 | 10/1983 | Wilson et al. | 310/87 |
| 4,500,226 | 2/1985 | Romand-Monnier et al. | 310/112 |

FOREIGN PATENT DOCUMENTS 2525305 10/1983 France .................................. 310/87

*Primary Examiner*—Patrick R. Salce
*Assistant Examiner*—D. L. Rebsch
*Attorney, Agent, or Firm*—Sughrue, Mion, Zinn, Macpeak, and Seas

[57] ABSTRACT

A coupling for electric motors, with each motor comprising a rotor (62, 63) and a stator (60, 61) mounted in a tubular shell (4, 5). The coupling includes the ends (8, 8a) of the tubular shells to be assembled, shaped for end-to-end inter-fitting in a manner which determines a relative angular position of the shells, the shape being identical on both shells; the coupling further including an internal coupling module (12) constituting a subassembly which is independent of the motors per se. The module comprises a coupling sleeve (15) for coupling the rotor shafts (16, 17), electrical connection means (29) for interconnecting the stators (60, 61), and support means acting both as radial bearings (19, 20) and as axial stops (21, 22) for the motors. The end of at least one of the rotor shafts to be coupled in rotation has a coupling section defined by the surface inside a closed, non-circular line having polar co-ordinates such that the polar radius is periodic over an angle equal to 2/n, where n is a positive integer greater than one, and the sleeve has at least one end with a corresponding bore. The ends of the sleeve and of the shaft further include respective conjugate inlet shapes enabling the shaft to penetrate into the sleeve regardless of their relative angular positions by virtue of a force which is solely axial, causing at least one of the two parts to rotate until both parts are correctly oriented relative to each other. The coupling further includes link means (11, 11a) between the internal coupling module (12) and the shells (4, 5).

5 Claims, 11 Drawing Figures

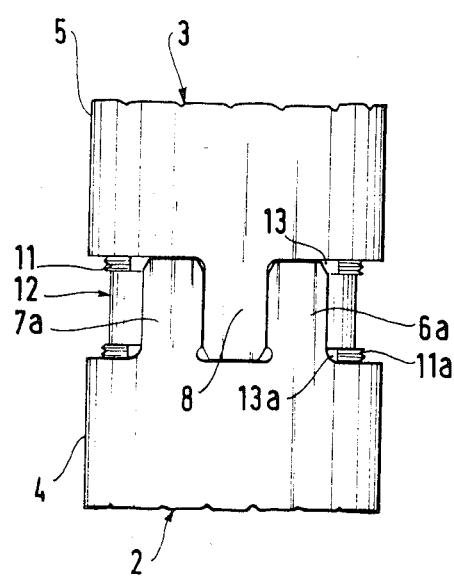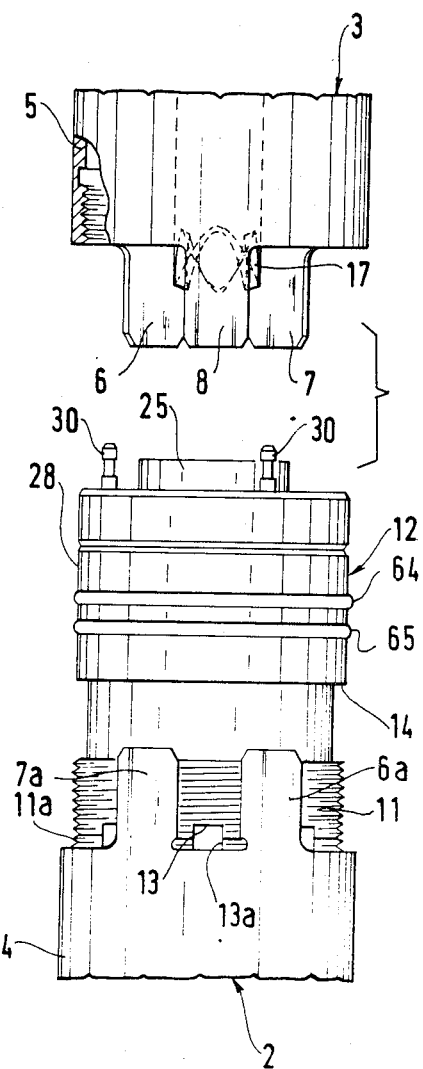

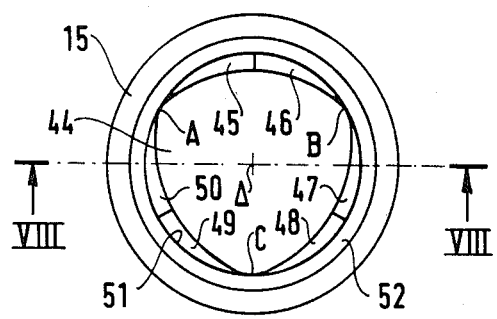
FIG.7
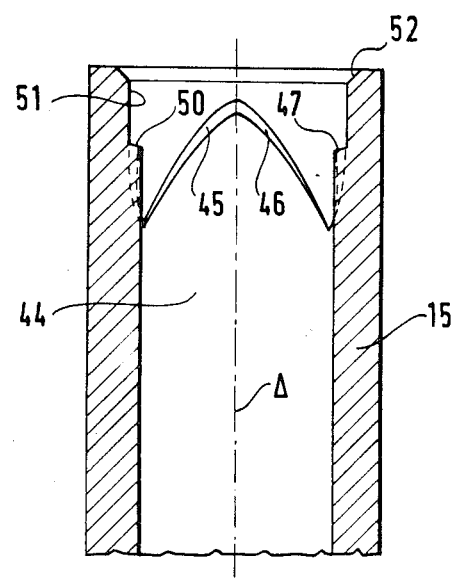
FIG.8
FIG.9　　FIG.10　　FIG.11
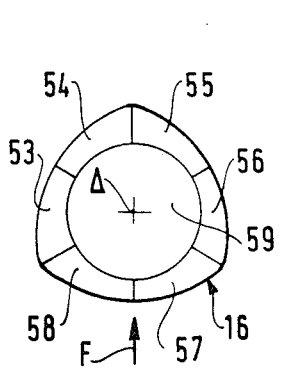
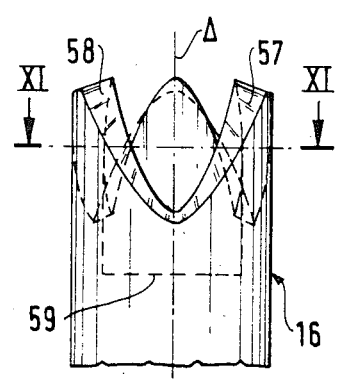
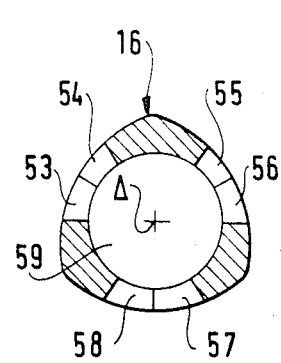

COUPLING FOR ELECTRIC MOTORS

The present invention relates to a coupling for electric motors.

BACKGROUND OF THE INVENTION

In some applications, such as pumped oil wells for example, immersed motor pump units are used which are lowered to great depths in the borehole to increase the flow rate.

The assembled equipment, i.e. the pump and the motor, must be of small diameter so as to be capable of being inserted in a borehole, and consequently, since the diameter is limited, it is necessary to extend the length in order to obtain given power. Thus, for construction reasons, it has been necessary to construct the motor in several lengths, with a varying number of lengths being coupled together, depending on the specific requirements in each pumping situation.

The invention thus relates to a coupling for coupling two electric motors.

French published patent application No. 2 525 305 (U.S. Pat. No. 4,500,226) describes such a coupling for two electric motors and in the description thereof, the coupling is assembled as follows: the outer shells of the two motors to be coupled are brought into contact and are coupled together, then the shafts are coupled, and finally the electrical contacts are coupled. This sequence has the advantage of avoiding the fragile parts, i.e. the electrical contacts and splines on the shafts being coupled first with the attendant risks of damage in the event of clumsy operation or poor alignment. However, this sequence implies that the shafts which are thus retracted relative to their respective shells are suitably oriented relative to their shells in such a manner that correct mutual orientation of the two shells necessarily implies correct mutual orientation of the two shafts to be coupled. The above-mentioned document describes means for indexing the shafts relative to the shells, which means are retracted after coupling has been achieved to leave the rotor free to rotate when coupled.

Such a system takes up room and includes various small moving parts which are more or less fragile.

Preferred implementations of the present invention simplify such a coupling by omitting the system for indexing the shaft relative to the shell, thereby enabling the room thus made available to be used for some other purpose.

SUMMARY OF THE INVENTION

The invention thus provides a coupling for electric motors, each of said motors comprising a rotor and a stator mounted in a tubular shell, the coupling including the improvement whereby the ends of the tubular shells to be assembled are shaped to be suitable for end-to-end interfitting in a manner which determines a relative angular position of the shells, said shape being identical on both shells to be assembled, the coupling further including an internal coupling module constituting a subassembly which is independent of the motors per se. The module comprises a coupling sleeve for coupling the rotor shafts, electrical connection means for interconnecting the stators, and support means acting both as radial bearings and as axial stops for the motors to be assembled, the end of at least one of the said rotor shafts to be coupled in rotation having a coupling section defined by the surface inside a closed, non-circular line having polar co-ordinates such that the polar radius is periodic over an angle equal to $2\pi/n$, where n is a positive integer greater than one, said sleeve having at least one end with a corresponding bore. The end of the sleeve and of the shaft further include respective conjugate inlet shapes enabling the shaft to penetrate into the sleeve regardless of their relative angular positions by virtue of a force which is solely axial, causing at least one of said two parts to rotate until both parts are correctly oriented relative to each other, the coupling further including link means between the internal coupling module and the shells.

Preferably, the said link means between the module and the shells comprises two rings whose axial positions are limited by two stops between which the rings are placed, said rings being threaded on their outer surfaces and being respectively screwable into the inside wall of the ends of the two tubular shells to be assembled, the walls of the tubular shells located axially between the two rings including windows enabling the rings to be turned for screwing them into the shells.

Advantageously, the coupling section is a curvilinear equilateral triangle having rounded vertices, and the conjugate inlet shape is constituted by helical cams located in the end of the bore of the sleeve and on the end of the shaft.

In accordance with other preferred features of a particular embodiment of the invention, the internal coupling module comprises the said coupling sleeve surrounded by a body in the form of an annular sleeve, the said coupling sleeve being free to rotate within two radial bearings mounted between the coupling sleeve and the body, the said coupling sleeve being held axially in the body by axial end stops situated at each end of the coupling sleeve, the said stops being held by means of flanges fixed to the ends of the body which surrounds the sleeve, and the said body of the module having electrical connector rods passing longitudinally therethrough for electrically interconnecting the motor stators.

The internal coupling module is preferably pierced by a plurality of longitudinal channels opening out in the axial ends of the flanges and angularly distributed around the body, some of these channels being provided at each of their ends with filters, and a groove being provided in the bore of the said body between the said two radial bearings, the said groove communicating with said longitudinal channels, and a radial hole being provided level with said groove through the coupling sleeve and leading to the bore through the coupling sleeve, the assembly being filled with oil.

BRIEF DESCRIPTION OF THE DRAWINGS

An embodiment of the invention is described, by way of example, with reference to the accompanying drawings, in which:

FIG. 3 is a side view showing a portion of FIG. 1 to a larger scale and centered on the coupling between two shells;

FIG. 4 is an exploded diagram showing the ends of two motors prior to coupling, the internal coupling module being inserted in the end of one of the motors;

FIG. 7 is an end view of the top end of the coupling sleeve on the shaft of the top motor;

FIG. 8 is a section on a line VIII—VIII in FIG. 7;

FIG. 9 is an end view of the bottom end of the shaft of the top motor;

FIG. 10 is a view in the direction of an arrow F in FIG. 9; and

FIG. 11 is a section view on a line XI—XI in FIG. 10.

MORE DETAILED DESCRIPTION

Figure 1:
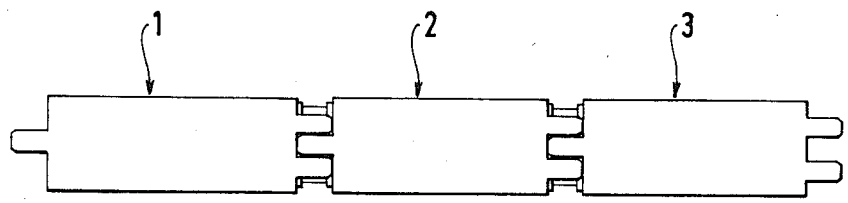
FIG. 1 is a diagrammatic side view showing three motors coupled together.

FIG. 1 shows three motors 1, 2 and 3 which are coupled together. They constitute, for example, the motor assembly of a motor-pump unit for pumping liquid from a deep well.

Figure 2:
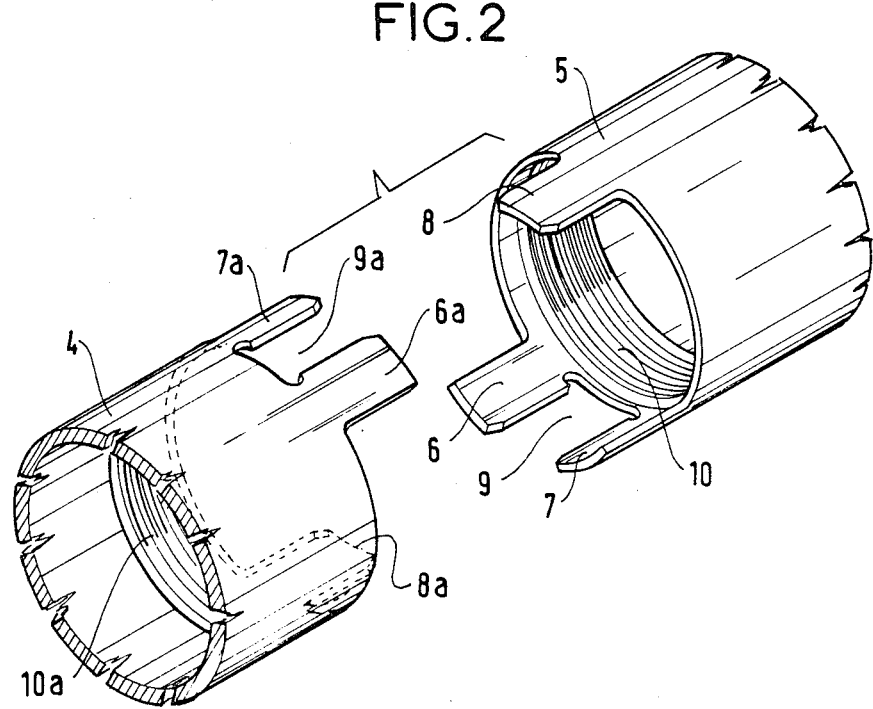
FIG. 2 is a perspective view of the facing ends of two empty motor shells.

FIG. 2 is a perspective view of the ends of the shells 4 and 5 of two consecutive motors such as 2 and 3 for assembling the stator portions thereof. FIG. 2 shows only the ends of the tubular shells of the motors without showing the magnetic circuits or the windings, which components are irrelevant to the coupling. Each end of the shell includes a pair of tongues 6 and 7 and an isolated tongue 8 which is angularly distant from the other two tongues. The tongues are disposed so as to enable the shells to be correctly angularly located relative to each other (and thus to ensure correct relative angular location between the associated stators 60 and 61, see FIG. 5). On the shell 4, the corresponding tongues are referenced 6a, 7a and 8a. The space 9 (or 9a) between the pair of tongues 6 and 7 (or 6a and 7a) is as wide as the isolated tongue 8 (or 8a). Thus, when the stators are coupled together, the tongue 8 is received in the space 9a and the tongue 8a is received in the space 9. As can be seen in this figure, the shells 4 and 5 are tapped at 10 and 10a over a short distance from their ends. These tapped threads are screwed to nuts 11 and 11a (see FIGS. 3, 4 and 5) mounted on an internal coupling module 12 so as to link together the two shells 4 and 5 and the coupling module 12.

FIG. 3 shows the assembled ends of the two motors 2 and 3. This view shows that when the shells 4 and 5 are coupled together there exist windows providing access to the nuts 1 and 11a to enable the nuts to be turned. To facilitate screwing, the nuts are provided with notches such as 13 and 13a.

If it is desirable to protect the coupling, it may be covered by a sheet applied against the adjacent ends of the shells 4 and 5 which are then fitted with bearing surfaces of slightly smaller diameter than that of the remainder of the shells so that the outside diameter of the sheet matches the outside diameter of the major portion of the shells. A few screws suffice to hold such a sheet in place. Such a protective device is entirely conventional and has not been shown in the figures.

The bottom of FIG. 4 shows the top end of the motor 2 which has been fitted with its interior coupling module 12, with the nut 11a being screwed tight and the nut 11 being free to slide up to a shoulder 14 on the module 12. The top of the figure shows the bottom end of the motor 3 ready to be lowered and coupled onto the motor 2.

Figure 5:
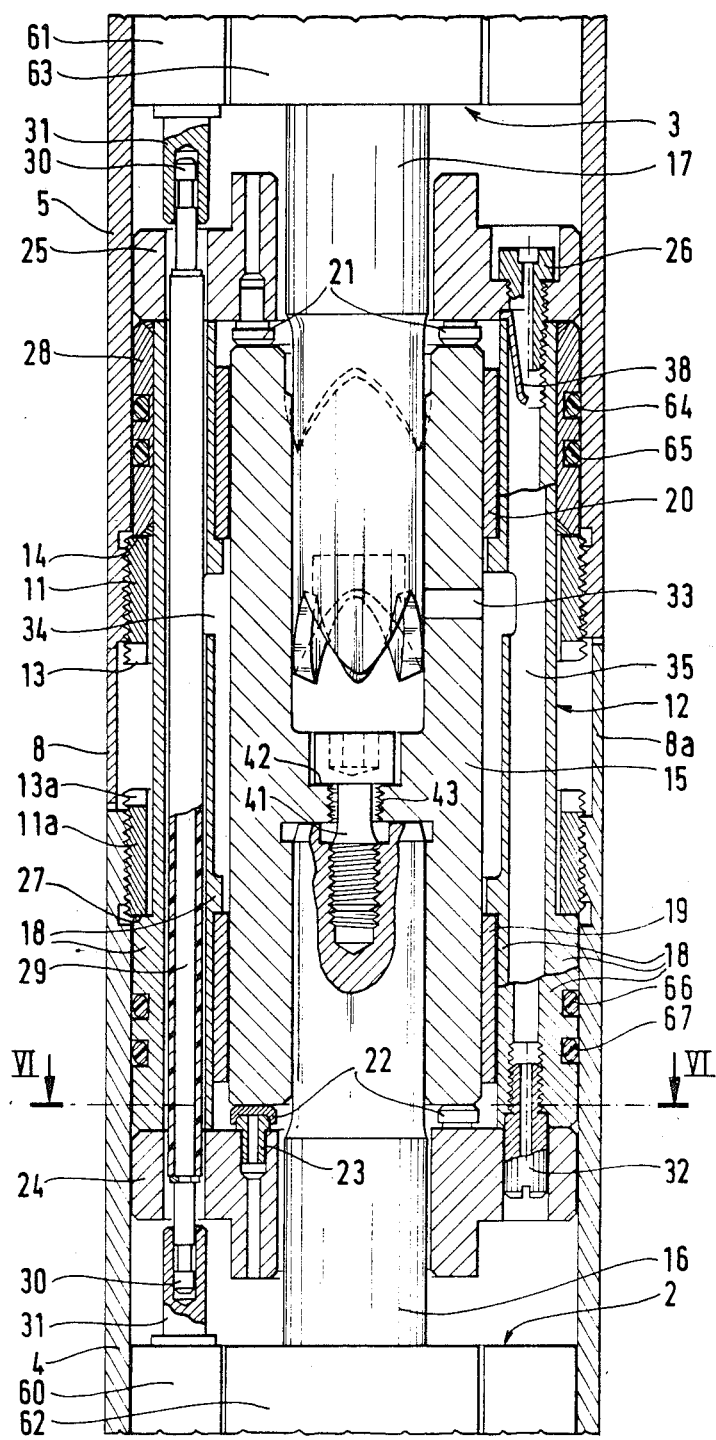
FIG. 5 is an axial section through a coupling in accordance with the invention and with the motors being coupled together.

FIG. 5 is an axial section through the entire coupling showing the details thereof in the motors-coupled position.

In this assembly, the internal coupling module 12 is readily visible in FIG. 4, but less easily distinguished in FIG. 5, given that the coupling is shown fully assembled in FIG. 5. The internal coupling module 12 performs several functions: it couples the drive shafts; it electrically interconnects the two stators; it serves as a radial bearing and as an axial stop for the rotors; and it filters the lubricating oil for the motors.

This internal coupling module constitutes a complete subassembly which is independent from the motors. It comprises a female sleeve 15 for coupling the shafts 16 and 17 of motors 2 and 3. The coupling sleeve 15 is surrounded by the body 18 of the internal module, which body is in the shape of an annular sleeve. The body 18 has locations for receiving radial bearings 19 and 20.

The coupling sleeve 15 thus rotates in the bearings 19 and 20 which therefore supports the rotors 62 and 63 of the motors 2 and 3. The body 18 of the module is also fitted into the shells 4 and 5 with sealing rings 64, 65, 66 and 67 providing sealing between the interior of the motors and the exterior.

At each end, the female coupling sleeve 15 is held by stops including shoes. The shoes are referenced 21 at the top end of the internal coupling module 12 and 22 at its bottom end. The shoes are held in place on pegs 23 with the bottom pegs being fixed in a flange 24 and the top pegs being fixed in a flange 25. The flanges are fixed to the body 18 by two diametrically opposite screws 26. The two screws 26 for fixing the bottom flange 24 to the body 18 can be seen in FIG. 6.

As can be seen in FIG. 5, the two nuts 1 and 11a are situated on the module 12 around the body 18 on a bearing surface provided thereon having a smaller diameter than the inside diameter of the tubular shells 4 and 5. The bearing surface is delimited by an upper shoulder 14 and a lower shoulder 27. As can be seen in FIG. 5, the upper shoulder 14 is constituted by the lower end of a ring 28 which is welded to the body 18 after the nuts 11 and 11a have been placed thereon.

The body 18 of the module 12 has three rods 29 passing therethrough to provide electrical interconnection of the stator windings of the motors 2 and 3. Each of these rods ends at each end with a male contact 30.

The relative positions of the tongues 6, 7 and 8 (or 6a, 7a, and 8a) for assembling the two stators ensures that the stators are correctly positioned angularly relative to each other and that each male contact 30 is coaxial with a corresponding female contact 31 mounted on the stator of the corresponding motor.

Each end of the body 18 is provided with two centering pegs 32 which are diametrically opposed and which serve for centering the flanges 24 and 25 on the body 18.

Finally, the internal coupling module 12 is also used for filtering the oil in which the entire assembly and the motors themselves are immersed.

To this end, the coupling sleeve 15 has a radial hole 33 passing therethrough and providing communication between the upper bore of the sleeve 15 and a groove 34 made in the bore of the body 18. The groove 34 is in communication with three axial channels 35, 36 and 37 passing through the body 18. At each end of these channels there is a filter such as the filter 38, only half of which is visible in the top right hand corner of FIG. 5. These filters are clamped between the adjacent flange 24 (or 25) and the body 18.

By rotating, the radial hole 33 acts somewhat as a centrifugal pump so that oil is sucked along the shaft 17, passes through the hole 33 and thence into the groove 34 and finally along the axial channel 35, 36 and 37 which then serve as collecting volumes for any impurities obtained in the oil and trapped by the filters 38 at the ends thereof.

Figure 6:
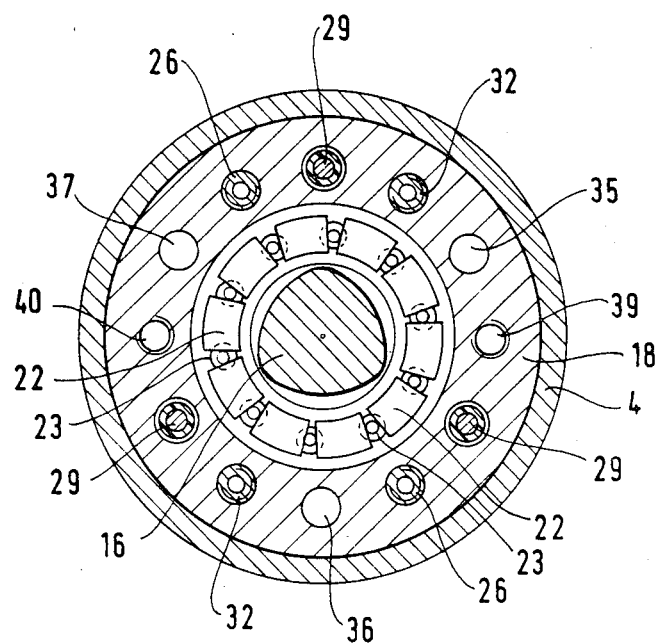
FIG. 6 is a cross-section on a line VI—VI of FIG. 5.

In addition to these three axial channels 35, 36 and 37, the body 18 also has six other regularly spaced channels passing therethrough, which channels do not include filters, and the screws 26 for fixing the flanges on the body 18 together with the centering pegs 32 are situated in the axes of four of these channels and are themselves axially pierced. The other two channels referenced 39 and 40 in FIG. 6 are tapped at their ends and serve to fix the flanges 24 and 25 on the body 18 without worrying about the relative positions of the holes for passing the electrical connection rods 29. All six of these additional axial channels allow the passage of oil. It is also quite clear that the radial hole 32 projects oil into these six channels, as well as into the channels 35, 36, and 37 provided with filters serving to collect oil-bourne impurities. However, in the long run, all the oil passes at one moment or another through these channels fitted with filters and is thus filtered thereby.

The internal coupling module 12 is thus a complete assembly which is initially inserted into the top end of a motor such as the motor 2. Once inserted, the drive shaft is axially connected to the rotary coupling sleeve 15 by means of a hollow-headed screw 41 which bears against the wall 42 separating the bores for receiving the shafts 16 and 17 respectively. In order to avoid losing the screw 41 during disassembly, the hole 43 by which the screw passes through the wall 42 is tapped in such a manner that once the screw has been disengaged from the end of the shaft 16, it remains connected to the module 12. Once the screw 41 has been tightened, the nut 11a is screwed into the shell 4. The assembly is then in the position shown in FIG. 4. The motor 3 is then lowered onto the motor 2 and care is taken to ensure that the shells 4 and 5 are properly positioned relative to each other as is clearly shown by the tongues 6, 7, 8, 6a, 7a and 8a.

The end of the shaft 17 penetrates into the upper bore of the coupling shaft 15 without difficulty, even if the angular position of the shaft relative to the sleeve is incorrect. The application of a force which is solely axial to the end of the shaft 17 as it enters the bore of the sleeve 15 serves to generate a tangential force causing relative rotation between the shaft and the sleeve such that if the initial relative angular position is not correct, the final relative angular position will be correct. This is achieved by means of a system of helical cams described below with reference to FIGS. 7 to 11. Once the motor 3 has been lowered so that the tips of tongues encounter the ends of the other shells, there remains only the nut 11 to be screwed into the shell 5. As shown in FIG. 5, the axial stops 21 and 22 axially fix the top end of the rotor of the bottom motor 2, while the bottom end of the motor 2 (not visible in this figure) is free, thereby allowing the motor a degree of axial expansion. In contrast, this figure does show this degree of axial expansion with respect to the bottom end of the motor 3. It can readily be seen that the end of the shaft 17 of the rotor is capable of penetrating more or less deeply into the bore of the sleeve 15.

Reference is now made to FIGS. 7 to 11 to describe the means which make it possible to avoid paying particular attention to the relative angular disposition of the sleeve 15 and the shaft 17 when they are coupled together. These means may naturally also apply for the coupling between the lower shaft 16 and the sleeve 15, however this is not essential, since at this stage there is only the module 12 to be coupled to the motor, and the module 12 is light enough and small enough to be much more easily manipulated than an entire motor 3 which may be as much as 8 to 9 meters long. It is thus relatively easy to orient the sleeve 15 directly prior to inserting the module 12 into the motor 2, whereas it is important to avoid any such handling between the upper and lower motors 3 and 2 to avoid any possibility of a crane-driver accidentally crushing the hand doing the manipulation.

FIG. 7 thus shows the top end of the sleeve 15 as seen from above and FIG. 8 is an axial section on a line VIII—VIII in FIG. 7.

These figures show that the sleeve 15 has a bore 44 which is in the form of a curvilinear equilateral triangle having rounded vertices A, B and C. The inlets to this bore have an inlet shape constituted by six helical cams 45 to 50 lying between the cylinder whose section corresponds to the coupling section 44 and the tube whose inside circular section of circumference 51 is circumscribed at the section 44. These cams are alternately lefthanded and righthanded. The helical cams are generated by a polar radius making an angle $\theta$ relative to a plane perpendicular to the axis $\Delta$, e.g. $\theta = 15°$.

This angle serves to improve centering at the moment of coupling. This inclination is visible in FIG. 8 by virtue of the distance which separates in the direction of the axis $\Delta$ the two curves delimiting the sides of the cams 45 or 46. The inlet to the bore is chamfered at 52.

FIGS. 9, 10 and 11 show the end of the shaft 16. FIG. 11 is a section on line XI—XI of FIG. 10.

The final coupling section, see FIG. 9, is a curvilinear equilateral triangle having rounded vertices and corresponding to the section 44 (to within the tolerances to allow for play). The top portion of the end of the shaft 16 has helical positioning cams 53 to 58. These cams are disposed between a tube whose inside section corresponds to the final coupling shape (a curvilinear equilateral triangle having rounded vertices) and a cylinder of circular section whose diameter is less than the circle inscribed in the said coupling shape. In addition, the end has a cylindrical hole 49 passing therethrough whose diameter corresponds to said cylinder. The purpose of this hole is to facilitate machining the helical cams and it also provided a degree of flexibility in the "teeth" constituted by the cams. The depth of the hole 59 is at least equal to the height of the "teeth".

As for the sleeve 15, the helical cams are generated by a polar radius inclined at an angle $\theta$ of about 15° relative to the plane perpendicular to the coupling axis $\Delta$.

In FIG. 5, the inlet shape at the end of the shaft 17 of the rotor 63, which inlet shape includes the cam 53 to 58 and the hole 59, is formed in the shaft of the rotor. Clearly this inlet shape could formed in a component which is fixed to the end of the shaft, e.g. by screwing.

As can be seen in FIG. 7, two helical cams, e.g. 47 and 48 are disposed between two consecutive vertices of the coupling section. In this case the cams 47 and 48 relate to the vertices B and C. As mentioned above, two consecutive cams are oppositely handed. This disposition ensures that the coupling can take place by rotation in one direction or the other depending on the initial relative position of the part being coupled when they come into engagement. This helps to reduce the angle of relative rotation which is required as compared with using a single helical cam between two consecutive vertices of the coupling section.

In such a case all the cams would have the same handedness.

Naturally, the male part (shaft 16) should have a corresponding arrangement of helical cams. In other words there should be two helical cams of opposite handedness between two consecutive vertices of the coupling section if there are two such cams on the coupling sleeve, and only one if there is only one such helical cam on the sleeve.

We claim:

1. A coupling for electric motors, each of said motors comprising a rotor and a stator mounted in a tubular shell, the coupling including the improvement whereby the ends of the tubular shells to be assembled are shaped to be suitable for end-to-end inter-fitting in a manner which determines a relative angular position of the shells, said shape being identical on both shells to be assembled, the coupling further including an internal coupling module constituting a subassembly which is independent of the motors per se, said module comprising a coupling sleeve for coupling the rotor shafts, electrical connection means for interconnecting the stators, and support means acting both as radial bearings and as axial stops for the motors to be assembled, the end of at least one of the said rotor shafts to be coupled in rotation having a coupling section defined by the surface inside a closed, non-circular line having polar co-ordinates such that the polar radius is periodic over an angle equal to $2\pi/n$, where n is a positive integer greater than one, said sleeve having at least one end with a corresponding bore, the said end of the sleeve and of the shaft further including respective conjugate inlet shapes enabling the shaft to penetrate into the sleeve regardless of their relative angular positions by virtue of a force which is solely axial causing at least one of said two parts to rotate until both parts are correctly oriented relative to each other, the coupling further including link means between the internal coupling module and the shells.

2. A coupling according to claim 1, wherein the said link means between the module and the shells comprises two rings whose axial positions are limited by two stops between which the rings are placed, said rings being threaded on their outer surfaces and being respectively screwable into the inside wall of the ends of the two tubular shells to be assembled, the walls of the tubular shells located axially between the two rings including windows enabling the rings to be turned for screwing them into the shells.

3. A coupling according to claim 1, wherein the said coupling section is a curvilinear equilateral triangle having rounded vertices, and the said conjugate inlet shape is constituted by helical cams located in the end of the bore of the sleeve and on the end of the shaft.

4. A coupling according to claim 1, wherein the said internal coupling module comprises the said coupling sleeve surrounded by a body in the form of an annular sleeve, the said coupling sleeve being free to rotate within two radial bearings mounted between the coupling sleeve and the body, the said coupling sleeve being held axially in the body by axial end stops situated at each end of the coupling sleeve, the said stops being held by means of flanges fixed to the ends of the body which surrounds the sleeve, and the said body of the module having electrical connector rods passing longitudinally therethrough for electrically interconnecting the motor stators.

5. A coupling according to claim 4, wherein the internal coupling module is pierced by a plurality of longitudinal channels opening out in the axial ends of the flanges and angularly distributed around the body, some of these channels being provided at each of their ends with filters, and a groove being provided in the bore of the said body between the said two radial bearings, the said groove communicating with said longitudinal channels, and a radial hole being provided level with said groove through the coupling sleeve and leading to the bore through the coupling sleeve, the assembly being filled with oil.

* * * * *